United States Patent
Tsubota et al.

(10) Patent No.: US 10,913,857 B2
(45) Date of Patent: Feb. 9, 2021

(54) METHOD FOR PRODUCING ALUMINUM HYDROXIDE-COATED SILICON CARBIDE PARTICLE POWDER AND METHOD FOR PRODUCING DISPERSION CONTAINING THE SAME POWDER AND DISPERSING MEDIUM

(71) Applicant: FUJIMI INCORPORATED, Kiyosu (JP)

(72) Inventors: Shogo Tsubota, Kiyosu (JP); Souma Taguchi, Kiyosu (JP); Keiji Ashitaka, Kiyosu (JP); Naoya Miwa, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 0 days.

(21) Appl. No.: 16/465,790

(22) PCT Filed: Sep. 28, 2018

(86) PCT No.: PCT/JP2018/036230
§ 371 (c)(1),
(2) Date: May 31, 2019

(87) PCT Pub. No.: WO2019/065956
PCT Pub. Date: Apr. 4, 2019

(65) Prior Publication Data
US 2020/0216677 A1 Jul. 9, 2020

(30) Foreign Application Priority Data

Sep. 28, 2017 (JP) .................................. 2017-188916
Sep. 28, 2017 (JP) .................................. 2017-188921

(51) Int. Cl.
C09C 1/30 (2006.01)
C01B 32/956 (2017.01)

(52) U.S. Cl.
CPC .......... *C09C 1/3054* (2013.01); *C01B 32/956* (2017.08); *C01P 2004/62* (2013.01)

(58) Field of Classification Search
CPC .................................................. C01B 32/956
See application file for complete search history.

(56) References Cited

U.S. PATENT DOCUMENTS

| 5,165,996 | A * | 11/1992 | Jacobson .......... C04B 35/62813 |
| | | | 428/404 |
| 2002/0161249 | A1 * | 10/2002 | Mul ....................... B01J 23/002 |
| | | | 549/534 |
| 2006/0032402 | A1 * | 2/2006 | Drews-Nicolai ..... C09C 1/3661 |
| | | | 106/436 |

FOREIGN PATENT DOCUMENTS

| EP | 0326165 | A2 | 8/1989 |
| EP | 3 543 210 | A1 | 9/2019 |
| JP | H01-192713 | A | 8/1989 |
| JP | 2012-106888 | A | 6/2012 |
| WO | WO-2019/065956 | A1 | 4/2019 |

OTHER PUBLICATIONS

Extended European Search Report issued on Application No. 18861647, dated Dec. 2, 2019.
Office Action issued in corresponding Japanese Application No. 2019-528934, dated Jul. 2, 2019, with English Translation.
Office Action issued in corresponding Japanese Patent Application No. 2019-151527 dated Jun. 30, 2020 with English translation.
Office Action issued in corresponding European Patent Application No. 18861647.8, dated Jul. 29, 2020.

* cited by examiner

*Primary Examiner* — Robert A Vetere
(74) *Attorney, Agent, or Firm* — Foley & Lardner LLP

(57) ABSTRACT

According to the present invention, there is provided a means for producing an aluminum hydroxide-coated SiC particle powder having a coating layer containing aluminum hydroxide on a surface of SiC particles. The present invention relates to a method for producing an aluminum hydroxide-coated SiC particle powder, which includes a coating step of maintaining a pH of a dispersion containing SiC particles, sodium aluminate, and water in a range of from 9 to 12 and forming coated particles having a coating layer containing aluminum hydroxide on a surface of the SiC particles.

18 Claims, No Drawings

METHOD FOR PRODUCING ALUMINUM HYDROXIDE-COATED SILICON CARBIDE PARTICLE POWDER AND METHOD FOR PRODUCING DISPERSION CONTAINING THE SAME POWDER AND DISPERSING MEDIUM

TECHNICAL FIELD

The present invention relates to a method for producing an aluminum hydroxide-coated silicon carbide particle powder and a method for producing a dispersion containing the powder and a dispersing medium.

BACKGROUND ART

Silicon carbide (SiC) has a high hardness, exhibits excellent heat resistance at high temperature, mechanical strength, impact resistance, abrasion resistance, oxidation resistance, and corrosion resistance, has a small thermal expansion coefficient, and thus is expected to be applied to various uses including polishing compositions and high-temperature structural members.

Upon the application of SiC, it has been investigated to use particulate SiC (SiC particles) by being dispersed in a dispersing medium or a medium of a polymer material and being mixed with other materials such as ceramic particles when forming a desired composition or material. In addition, it has been investigated to conduct dispersion and mixing after coordinating a compound capable of imparting a desired function to the periphery of the SiC particles for the improvement in function of dispersions and mixtures containing particulate SiC (SiC particles), formed bodies formed from these, and the like. Hence, SiC particles have been particularly desired which exhibit high dispersibility in a medium and can be uniformly mixed with other materials in a state of being coordinated with a compound capable of imparting a desired function to the periphery thereof.

It is disclosed in JP 2012-106888 A that it is possible to improve the insulation property of a SiC powder by coating the surface of the SiC powder with an oxide coating film such as alumina which has a thickness of from 10 nm to 500 nm and is provided by firing. It is also disclosed that it is possible to realize heat resistance, high thermal conductivity, and high insulation property of a composite composition by containing such a SiC powder.

SUMMARY OF INVENTION

However, by the technology according to JP 2012-106888 A, sufficient dispersibility of the powder in the medium cannot be obtained.

Accordingly, the present invention has been made in view of the above problems, and an object thereof is to provide a means capable of producing a coated SiC particle powder which exhibits high dispersibility when being dispersed in a medium and has a coating layer containing an aluminum-containing compound on the surface of SiC particles. More specifically, an object of the present invention is to provide a means capable of producing an aluminum hydroxide-coated SiC particle powder having a coating layer containing aluminum hydroxide on the surface of SiC particles.

In order to solve the above problems, the present inventors have extensively carried out research. As a result, it has been found out that the above problems can be solved by selecting a proper compound as a coating component and properly setting the conditions for the coating reaction, and the present invention has been thus completed.

In other words, the above problem of the present invention is solved by the following means:

A method for producing an aluminum hydroxide-coated SiC particle powder, including a coating step of adjusting a pH of a dispersion containing SiC particles, sodium aluminate, and water to a range of from 9 to 12 and forming coated particles having a coating layer containing aluminum hydroxide on a surface of the SiC particles.

DESCRIPTION OF EMBODIMENTS

Hereinafter, the present invention will be described. It should be noted that the present invention is not limited only to the following embodiments.

In the present specification, "X to Y" denoting a range means "X or more and Y or less". In addition, in the present specification, operation and measurement of physical properties and the like are conducted under conditions of room temperature (20° C. to 25° C.)/relative humidity of 40% to 50% RH unless otherwise stated.

<Aluminum Hydroxide-Coated SiC Particle Powder>

A first aspect of the present invention relates to a method for producing an aluminum hydroxide-coated SiC particle powder, which includes a coating step of adjusting a pH of a dispersion containing SiC particles, sodium aluminate, and water to a range of from 9 to 12 and forming coated particles having a coating layer containing aluminum hydroxide on a surface of the SiC particles. According to the production method, there is provided a means capable of producing a coated SiC particle powder having a coating layer containing aluminum hydroxide on the surface of SiC particles.

The present inventors presume the mechanism by which the above problems are solved by the present invention as follows.

In the alumina-coated SiC particles as described in JP 2012-106888 A, the aggregation of particles forming the SiC powder proceeds via the aggregation of alumina when heating the precursor of alumina coating agent. Hence, the degree of aggregation of the alumina-coated SiC particles to be generated significantly increases as compared to that of SiC particles which are raw material particles, the difference in the degree of aggregation among the individual particles also becomes great in association with this, and thus an increase in the variation in particle size also becomes remarkable. It is difficult to obtain a dispersion exhibiting high dispersibility not only in the case of dispersing from a powder formed of such alumina-coated SiC particles in a medium as it is but also in the case of dispersing the powder after being mechanical pulverized.

On the other hand, the aluminum hydroxide-coated SiC particles produced by the production method according to the present invention contain aluminum hydroxide in the coating layer, and the precursor of aluminum hydroxide does not cause remarkable aggregation like alumina even at the time of generation of aluminum hydroxide. Consequently, such aluminum hydroxide-coated SiC particles are generated while maintaining the low aggregability of SiC particles which are raw material particles, and it is thus possible to obtain a dispersion exhibiting high dispersibility even if the aluminum hydroxide-coated SiC particle powder is dispersed in a medium as it is.

Particularly preferred aspects of the first aspect of the present invention may include the following second aspect of the present invention and third aspect of the present invention.

Here, the second aspect of the present invention relates to a method for producing an aluminum hydroxide-coated SiC particle powder, which includes a step (A) of preparing a raw material dispersion containing SiC particles, sodium aluminate, and water; and the coating step according to the first aspect of the present invention described above, namely a coating step of adjusting a pH of a dispersion containing SiC particles, sodium aluminate, and water to a range of from 9 to 12 and forming coated particles having a coating layer containing aluminum hydroxide on a surface of the SiC particles and in which the coating step is a step (B) of forming coated particles having a coating layer containing aluminum hydroxide on a surface of the SiC particles (hereinafter, also referred to as aluminum hydroxide-coated SiC particles) by adding an acid to the raw material dispersion prepared in the step (A) to adjust a pH to a range of from 10 to 12.

In addition, in the production method according to the present invention, it is considered that a number of aluminum hydroxide nuclei can be generated and aluminum hydroxide particles can be formed in the case of being under a condition so that sodium aluminate is present in the dispersion liquid temporarily in an excessive amount. Moreover, it is considered that the performance of a formed body and the like fabricated using the aluminum hydroxide-coated SiC particle powder produced is improved as the number of aluminum hydroxide particles is smaller. For this reason, it is desirable to suppress the formation of aluminum hydroxide particles. Here, in the production method according to the present invention, it is possible to suppress the nucleation of aluminum hydroxide and the subsequent formation of aluminum hydroxide particles by adding a solution of sodium aluminate and an acid into the SiC dispersion liquid while maintaining the pH in a range of from 9.0 to 12.0. Specifically, the number of nuclear particles of aluminum hydroxide to be formed from an aluminate ion decreases as a solution of sodium aluminate and an acid are added to the SiC dispersion so that the pH can be maintained in a range of from 9.0 to 12.0 and the concentration of aluminate ion is maintained in a low state. Hence, the formation of aluminum hydroxide particles is suppressed.

Hence, the third aspect of the present invention relates to a method for producing an aluminum hydroxide-coated SiC particle powder, which includes a step (C) of respectively preparing a raw material dispersion (1) which contains SiC particles, an alkali, and water and has a pH of from 9.0 to 12.0 and a raw material solution (2) containing sodium aluminate and water; and the coating step according to the first aspect of the present invention described above, namely a coating step of adjusting a pH of a dispersion containing SiC particles, sodium aluminate, and water to a range of from 9 to 12 and forming coated particles having a coating layer containing aluminum hydroxide on a surface of the SiC particles and in which the coating step is a step (D) of adding the raw material solution (2) and an acid to the raw material dispersion (1) to maintain a pH in a range of from 9.0 to 12.0 and forming coated particles having a coating layer containing aluminum hydroxide on a surface of the SiC particles.

Incidentally, the mechanism described above is based on speculation, and the correct or incorrect thereof does not affect the technical scope of the present invention.

(Aluminum Hydroxide-Coated SiC Particle Powder)

In the production method according to an aspect of the present invention, an aluminum hydroxide-coated SiC particle powder is produced.

In the present specification, aluminum hydroxide-coated SiC particles are coated particles having SiC particles and a coating layer which contains aluminum hydroxide and covers the SiC particles. Here, the aluminum hydroxide-coated SiC particles may be particles in which at least a part of the SiC particles are coated with a coating layer containing aluminum hydroxide.

In addition, in the present specification, the aluminum hydroxide-coated SiC particle powder represents a plurality of aluminum hydroxide-coated SiC particles or a composition containing the particles. In the present specification, the term "powder" is used for convenience, but the term represents not only a substance in a powder form (dry state) but also a substance which is present in a state of being dispersed in a dispersing medium and can be obtained in a powder form when the dispersing medium is volatilized.

In other words, in the production method according to an aspect of the present invention, there can also be a case in which the aluminum hydroxide-coated SiC particle powder which is a product contains components other than the aluminum hydroxide-coated SiC particles. However, it is particularly preferable that the components other than the aluminum hydroxide-coated SiC particles which can be contained in the aluminum hydroxide-coated SiC particle powder are unavoidable impurities in the coating treatment. In the present specification, the unavoidable impurities in the coating treatment represent, for example, components which can be contained in association with the formation of aluminum hydroxide-coated SiC particles, such as raw material particles and raw materials of unreacted coating components, by-products, reagents which are used in reactions and can be added if necessary, impurities derived from raw materials, and the like. Among these components, particularly the presence of aluminum hydroxide particles generated from sodium aluminate of a raw material is considered. It should be noted that the unavoidable impurities in the coating treatment do not include components which can be arbitrarily added for the purpose of functional expression in the production process and after the production.

The proportion of aluminum hydroxide-coated SiC particles in the aluminum hydroxide-coated SiC particle powder is most preferably 100% by mass with respect to the total mass of the aluminum hydroxide-coated SiC particle powder. However, it is preferable to contain the aluminum hydroxide-coated SiC particles in the aluminum hydroxide-coated SiC particle powder as a main component when production efficiency and the like are taken into consideration. The proportion of aluminum hydroxide-coated SiC particles in the aluminum hydroxide-coated SiC particle powder is more preferably 50% by mass or more, still more preferably 70% by mass or more, yet still more preferably 99% by mass or more, and particularly preferably 99.9% by mass or more (upper limit: 100% by mass).

In addition, in a case in which components other than the aluminum hydroxide-coated SiC particles are aluminum hydroxide particles, the proportion of the number of aluminum hydroxide particles is not particularly limited, but it is preferably 5% or less, more preferably 3% or less, still more preferably 1% or less, and most preferably 0% with respect to the total number of particles of the aluminum hydroxide-coated SiC particle powder.

Incidentally, in the aluminum hydroxide-coated SiC particle powder, there can also be a case in which it is difficult to accurately quantitatively analyze the proportion of aluminum hydroxide-coated SiC particles in the aluminum hydroxide-coated SiC particle powder or remove the particles depending on the kind of components other than the aluminum hydroxide-coated SiC particles contained in this powder from the technical and economic viewpoints. Particularly, in a case in which other components are unavoidable impurities in the coating treatment, there is a case in which it is more difficult to accurately quantitatively analyze the proportion of aluminum hydroxide-coated SiC particles in the aluminum hydroxide-coated SiC particle powder or remove the particles depending on the kind of the components because of the circumstances that the analytical features are similar and the like. However, even in this case, the aluminum hydroxide-coated SiC particle powder exhibits favorable dispersibility in a dispersing medium and desired properties derived from the properties of raw material particles and coating components in a case in which it is confirmed by the analysis method to be described later that the aluminum hydroxide-coated SiC particle powder contains the aluminum hydroxide-coated SiC particles.

It is preferable that the aluminum hydroxide-coated SiC particle powder to be produced by the production method according to an aspect of the present invention can maintain the form as aluminum hydroxide-coated SiC particles even in the case of being washed with a solvent (preferably water) and a state of being dispersed in a dispersing medium (preferably water).

(Average Secondary Particle Size of Aluminum Hydroxide-Coated SiC Particle Powder)

The average secondary particle size of the aluminum hydroxide-coated SiC particle powder is not particularly limited but is preferably 2 µm or less. It is possible to further improve the dispersibility when the aluminum hydroxide-coated SiC particle powder is dispersed in a medium when the average secondary particle size is in this range. The particles having a small average secondary particle size have originally a low degree of aggregation and also a small variation in particle size. In addition, particles having a smaller particle size exhibit lower aggregability. Accordingly, it is possible to obtain a dispersion exhibiting higher dispersibility when an aluminum hydroxide-coated SiC particle powder having an average secondary particle size of 2 µm or less is dispersed in a medium. It is preferable to realize higher dispersibility when the aluminum hydroxide-coated SiC particle powder is dispersed in a medium by combining both the effect of diminishing aggregation at the stage of forming the coating layer and the effect of diminishing aggregation as particles in this manner. From the same viewpoint, the average secondary particle size of the aluminum hydroxide-coated SiC particle powder is preferably 1.5 µm or less, more preferably 1.0 µm or less, and still more preferably 0.5 µm or less. In addition, the average secondary particle size of the aluminum hydroxide-coated SiC particle powder is not particularly limited but is preferably 0.03 µm or more. It corresponds to the preferred average secondary particle size of SiC particles to be described later. From the same viewpoint, the average secondary particle size of the aluminum hydroxide-coated SiC particle powder is more preferably more than 0.03 µm, still more preferably 0.05 µm or more, yet still more preferably more than 0.05 µm, particularly preferably 0.1 µm or more, and most preferably more than 0.1 µm. Here, the value of the average secondary particle size of the aluminum hydroxide-coated SiC particle powder can be measured in a dispersion in which the aluminum hydroxide-coated SiC particle powder is dispersed in a dispersing medium so as to have an appropriate concentration for measurement using a scattering particle size distribution measurement apparatus LA-950 manufactured by Horiba, Ltd. Incidentally, the details of the measurement method are described in Examples.

(Ratio of Average Secondary Particle Size of Aluminum Hydroxide-Coated SiC Particle Powder to Average Secondary Particle Size of SiC Particles)

The ratio of the average secondary particle size of the aluminum hydroxide-coated SiC particle (particle after being coated) powder with respect to the average secondary particle size of the SiC particles (particles before being coated) at the aluminum hydroxide-coated SiC particle powder (hereinafter also referred to as the ratio of the average secondary particle size to the SiC particles) is not particularly limited but is preferably 10 or less. The aluminum hydroxide-coated SiC particle powder is generated while maintaining high dispersibility of the SiC particles when the ratio is in this range. Hence, a dispersion exhibiting higher dispersibility is obtained when the aluminum hydroxide-coated SiC particle powder is dispersed in a medium. From the same viewpoint, the ratio of the average secondary particle size to the SiC particles is preferably 5 or less, more preferably 3 or less, still more preferably 2 or less, yet still more preferably 1.6 or less, and particularly preferably 1.1 or less. In addition, the ratio of the average secondary particle size to the SiC particles is not particularly limited but is preferably more than 1. The aluminum hydroxide-coated SiC particle powder is formed as the surface of the SiC particles is coated with a coating layer containing aluminum hydroxide. Hence, the ratio is in this range in the case of adopting a production method providing higher productivity without conducting a further operation for crushing the secondary particles of SiC particles in the production of the aluminum hydroxide-coated SiC particle powder. However, in an aspect of the present invention, the method may further include an operation for crushing the secondary particles of SiC particles, and the ratio of the average secondary particle size to the SiC particles may be 1 or less (lower limit: more than 0) regardless of whether or not the method includes the operation. Here, the average secondary particle size of the aluminum hydroxide-coated SiC particle powder can be determined by the method described above and the average secondary particle size of the SiC particles can be determined by the method to be described later, respectively.

(Ratio of Average Secondary Particle Size of Aluminum Hydroxide-Coated SiC Particle Powder to Average Primary Particle Size of SiC Particles)

The ratio of the average secondary particle size of the aluminum hydroxide-coated SiC particle (particle after being coated) powder with respect to the average primary particle size of the SiC particles (particles before being coated) at the aluminum hydroxide-coated SiC particle powder (also referred to as the ratio of the average secondary particle size to the average primary particle size of SiC particles) is not particularly limited but is preferably 50 or less. It is possible to obtain a dispersion exhibiting high dispersibility to be desired in various kinds of uses when the aluminum hydroxide-coated SiC particle powder is dispersed in a medium when the ratio is in this range. From the same viewpoint, the ratio of the average secondary particle size to the average primary particle size of the SiC particles is preferably 20 or less, more preferably 10 or less, still more preferably 9 or less, and particularly preferably 7 or less. In addition, the ratio of the average secondary particle size with respect to the average primary particle size of the SiC particles is usually more than 1. This is because the aluminum hydroxide-coated SiC particles are formed as the surface of SiC particles is coated with a coating layer containing aluminum hydroxide. In addition, the ratio is preferably 3 or more and more preferably 5 or more from the viewpoint of production efficiency considering the aggregability of SiC particles. Here, the average secondary particle size of the aluminum hydroxide-coated SiC particle powder can be determined by the method described above and the average primary particle size of the SiC particles can be determined by the method to be described later, respectively.

(Isoelectric Point of Aluminum Hydroxide-Coated SiC Particle Powder)

The pH of the isoelectric point of the aluminum hydroxide-coated SiC particle powder is not particularly limited but is preferably 4.5 or more. When the pH of the isoelectric point is in this range, aggregation in the dispersing medium hardly occurs and favorable dispersibility is maintained even in the case of concurrently using the aluminum hydroxide-coated SiC particle powder and other particles to be described later in the dispersion containing a dispersing medium. Hence, a dispersion exhibiting higher dispersibility is obtained when the aluminum hydroxide-coated SiC particle powder and other particles are dispersed in a medium. In addition, the pH of the isoelectric point of the aluminum hydroxide particles is about 8.8, and it is thus indicated that the coating is more favorably conducted as the pH of the isoelectric point of the aluminum hydroxide-coated SiC particle powder is closer to this value. From this viewpoint, the pH of the isoelectric point of the aluminum hydroxide-coated SiC particle powder is more preferably 5 or more, still more preferably 5.5 or more, yet still more preferably 6 or more, particularly preferably 6.5 or more, and most preferably 7.5 or more. In addition, the pH of the isoelectric point of the aluminum hydroxide-coated SiC particle powder is not particularly limited but is preferably 9 or less and more preferably 8.5 or less. Hence, the pH of the isoelectric point of the aluminum hydroxide-coated SiC particle powder according to a preferred aspect of the present invention is, for example, 4.5 or more and 9 or less. In addition, the pH of the isoelectric point of the aluminum hydroxide-coated SiC particle powder according to a more preferred aspect of the present invention is, for example, 7.5 or more and 9 or less.

The pH of the isoelectric point can be calculated by the following equation from the pH values before and after the sign of the zeta potential changes and the zeta potentials at the pH values before and after the change when a solution for zeta potential measurement having a pH in 1.0 scale, for example, a pH in a range of from 3.0 to 10.0 in 1.0 scale is prepared and the zata potential is measured.

$$\text{pH of isoelectric point} = \frac{\alpha \times \zeta_\beta - \beta \times \zeta_\alpha}{\zeta_\beta - \zeta_\alpha} \quad [\text{Math. 1}]$$

$\alpha$ and $\beta$: pH values before and after sign of zeta potential changes ($\alpha < \beta$)

$\zeta_\alpha$: zeta potential at pH value $\alpha$ $\zeta_\beta$: zeta potential at pH value $\beta$ Here, the pH can be measured using a pH meter (model number: F-71) manufactured by Horiba, Ltd. In addition, the zeta potential can be measured using a zeta potential measurement apparatus (trade name "Zetasizernano ZSP" manufactured by Malvern Instruments Ltd.).

(Silicon Carbide (SiC) Particles)

Silicon carbide (SiC) particles have a high hardness, exhibit excellent heat resistance at high temperature, mechanical strength, impact resistance, abrasion resistance, oxidation resistance, and corrosion resistance, have a small thermal expansion coefficient, and thus can be used in various uses including polishing compositions and high-temperature structural members.

It is preferable that the SiC particles are maintained in a state of being dispersed in the dispersing medium from the generation of particles to the coating thereof with a coating layer although it is not particularly limited. For example, it may be mentioned that the SiC particles are maintained in a state of being dispersed in the dispersing medium from the generation of particles to the coating thereof with a coating layer in the step (B) in the production method according to the second aspect of the present invention or the step (D) in the production method according to the third aspect of the present invention. The SiC particles can avoid aggregation due to drying as the SiC particles are maintained in a state of being dispersed in the dispersion from the generation thereof to the coating thereof with a coating layer. Hence, the high dispersibility of the SiC particles at the time of generation is maintained at a higher level even in the state of aluminum hydroxide-coated SiC particles, and thus extremely high dispersibility is obtained when the aluminum hydroxide-coated SiC particle powder is dispersed in a medium.

Incidentally, as to be described later, it is easier to control the average secondary particle size and the ratio of the average secondary particle size to the average primary particle size to the preferred ranges to be respectively described later as SiC particles maintained in a state of being dispersed in the dispersion after the generation of particles are used as raw material particles.

The average primary particle size of the SiC particles is not particularly limited but is preferably 900 nm or less. When the average primary particle size is in this range, a dispersion exhibiting higher dispersibility is obtained when the aluminum hydroxide-coated SiC particle powder to be produced is dispersed in a medium. From the same viewpoint, the average primary particle size of the SiC particles is more preferably 700 nm or less and still more preferably 600 nm or less. In addition, the average primary particle size of the SiC particles is not particularly limited but is preferably 1 nm or more. It is possible to further improve the function of the aluminum hydroxide-coated SiC particles to be formed when the average primary particle size is in this range. From the same viewpoint, the average primary particle size of the SiC particles is more preferably 5 nm or more and still more preferably 10 nm or more. Here, the value of the average primary particle size of the SiC particles can be calculated using the value of the true density of the SiC particles based on the average value of the specific surface area (SA) of the SiC particles calculated from the value continuously measured 3 to 5 times by a BET method on the assumption that the shape of the SiC particles is a true sphere. The measurement of the specific surface area of the SiC particles can be conducted, for example, using Flow Sorb II 2300 manufactured by Micromeritics Instrument Corp.

The average secondary particle size of the SiC particles is not particularly limited but is preferably less than 2 μm. When the average secondary particle size is in this range, a dispersion exhibiting higher dispersibility is obtained when the aluminum hydroxide-coated SiC particle powder to be produced is dispersed in a medium. From the same viewpoint, the average secondary particle size of the SiC particles is more preferably 1.9 μm or less, still more preferably 1.8 μm or less, yet still more preferably less than 1.5 μm, particularly preferably less than 1.0 μm, and most preferably less than 0.5 μm. In addition, the average secondary particle size of the SiC particles is not particularly limited but is preferably 0.03 μm or more. It is possible to conduct coating of the aluminum hydroxide-coated SiC particles at a high efficiency when the average secondary particle size is in this range. From the same viewpoint, the average secondary particle size of the SiC particles is preferably 0.05 μm or more and more preferably 0.1 μm or more. Here, the value of the average secondary particle size of the SiC particles can be measured using a scattering particle size distribution measurement apparatus LA-950 manufactured by Horiba, Ltd.

Here, the ratio (average secondary particle size/average primary particle size) of the average secondary particle size to average primary particle size of the SiC particles is not particularly limited but is preferably 10 or less. The dispersibility of the aluminum hydroxide-coated SiC particle powder is further improved when the ratio is in this range. From the same viewpoint, the ratio of the average secondary particle size to average primary particle size of the SiC particles is more preferably 8 or less and still more preferably 6 or less. In addition, the ratio of the average secondary particle size to average primary particle size of the SiC particles is not particularly limited but is preferably 1.5 or more. The productivity is further improved when the ratio is in this range. From the same viewpoint, the ratio of the average secondary particle size to average primary particle size of the SiC particles is more preferably 2 or more, still more preferably 2.5 or more, and particularly preferably 3 or more. Incidentally, the ratio is particularly preferably 1 from the viewpoint of further improving the dispersibility of the aluminum hydroxide-coated SiC particles.

In addition, as the SiC particles, a commercially available product or a synthetic product may be used. The commercially available product is not particularly limited, but, for example, GC #40000, GC #8000S and the like manufactured by Fujimi Incorporated can be used.

The SiC particles may be used singly or as a composite thereof or in mixture of two or more kinds thereof.

(Coating Layer)

The coating layer of the aluminum hydroxide-coated SiC particles contains aluminum hydroxide. The coating layer containing an aluminum compound can impart a function of imparting insulation property, a function as a sintering aid when producing a formed body, and a function of improving the polishing property when being used in a polishing composition to the SiC particles. Among the aluminum compounds, aluminum hydroxide hardly causes aggregation at the time of coating layer formation using a precursor of aluminum hydroxide. For this reason, the aluminum hydroxide-coated SiC particles can realize higher dispersibility when being dispersed in a medium while having a function derived from the aluminum compound.

In addition, the coating layer may contain other components as long as the effects of the present invention are not impaired.

Generally, the pH of the isoelectric point at the zeta potential tends to increase as the film thickness of the coating layer increases although there can be a case in which it is difficult to directly measure the film thickness of the coating layer because of a change in the existential state of particles due to coating. Hence, the fact that the coating layer has a preferred film thickness can be judged from the fact that the pH value of the isoelectric point of the aluminum hydroxide-coated SiC particles is in the preferred range described above.

The fact that the coating layer contains aluminum hydroxide can be confirmed by observing and analyzing the aluminum hydroxide-coated SiC particles by SEM (Scanning Electron Microscope)-EDX (Energy Dispersive X-ray Spectroscopy) and EELS (Electron Energy Loss Spectroscopy).

(Method for Producing Aluminum Hydroxide-Coated SiC Particle Powder)

(Production Method According to First Aspect)

The first aspect of the present invention relates to a method for producing an aluminum hydroxide-coated SiC particle powder, which includes a coating step of adjusting a pH of a dispersion containing SiC particles, sodium aluminate, and water to a range of from 9 to 12 and forming coated particles having a coating layer containing aluminum hydroxide on a surface of the SiC particles.

Particularly preferred aspects of the first aspect of the present invention may include a second aspect of the present invention and a third aspect of the present invention to be described below. Among these, the third aspect of the present invention is more preferable.

(Production Method According to Second Aspect)

As described above, the second aspect of the present invention relates to a method for producing an aluminum hydroxide-coated SiC particle powder, which includes a step (A) of preparing a raw material dispersion containing SiC particles, sodium aluminate, and water; and the coating step according to the first aspect of the present invention described above, namely a coating step of adjusting a pH of a dispersion containing SiC particles, sodium aluminate, and water to a range of from 9 to 12 and forming coated particles having a coating layer containing aluminum hydroxide on a surface of the SiC particles and in which the coating step is a step (B) of forming coated particles (aluminum hydroxide-coated SiC particles) having a coating layer containing aluminum hydroxide on a surface of the SiC particles by adding an acid to the raw material dispersion prepared in the step (A) to adjust a pH to a range of from 10 to 12.

In other words, the present aspect is a method for producing an aluminum hydroxide-coated SiC particle powder, which includes a step (A) of preparing a raw material dispersion containing SiC particles, sodium aluminate, and water; and a step (B) of forming coated particles having a coating layer containing aluminum hydroxide on a surface of the SiC particles by adding an acid to the raw material dispersion prepared in the step (A) to adjust a pH to a range of 10 or more and 12 or less.

The aluminum hydroxide-coated SiC particle powder to be produced is preferably the aluminum hydroxide-coated SiC particle powder according to an aspect of the present invention described above.

Here, the aluminum hydroxide-coated SiC particle powder to be produced may be produced in a state of being dispersed in a dispersing medium or may be produced by conducting a step of removing the dispersing medium thereafter.

[Step (A)]

The method for producing an aluminum hydroxide-coated SiC particle powder according to an aspect of the present invention includes a step of preparing a raw material dispersion containing SiC particles, sodium aluminate, and water (hereinafter, also simply referred to as a raw material dispersion).

The method for preparing the raw material dispersion is not particularly limited, but examples thereof may include a method in which sodium aluminate is added to a water-based dispersion of SiC particles (a dispersion containing water as a dispersing medium, preferably a water dispersion), a method in which SiC particles are added to a water-based solution of sodium aluminate (a solution containing water as a solvent, preferably an aqueous solution), a method in which SiC particles and sodium aluminate are added to a dispersing medium containing water (preferably water), a method in which a water-based dispersion of SiC particles (a dispersion containing water as a dispersing medium, preferably a water dispersion) and a water-based solution of sodium aluminate (a solution containing water as a solvent, preferably an aqueous solution) are mixed together, and the like. Among these, a method in which sodium aluminate is added to a water-based dispersion of SiC particles is preferable.

In the method in which sodium aluminate is added to a water-based dispersion of SiC particles, the content of the SiC particles in the water-based dispersion of SiC particles is not particularly limited but is preferably 10% by mass or more, more preferably 15% by mass or more, and still more preferably 20% by mass or more with respect to the total mass of the water-based dispersion from the viewpoint of productivity. The content of the SiC particles in the water-based dispersion of SiC particles is not particularly limited but is preferably 50% by mass or less, more preferably 40% by mass or less, and still more preferably 30% by mass or less with respect to the total mass of the water-based dispersion from the viewpoint of dispersibility.

Here, it is preferable that the SiC particles are maintained in a state of being dispersed in the dispersing medium from the generation thereof to the preparation of a dispersion containing the SiC particles, sodium aluminate, and water in the step (A) although it is not particularly limited. Moreover, it is more preferable that the SiC particles are maintained in a state of being dispersed in the dispersing medium from the generation thereof to the coating thereof with a coating layer in the step (B) to be described later. The SiC particles can avoid aggregation due to drying as the SiC particles are maintained in a state of being dispersed in the dispersion during the time from the generation thereof to the coating thereof with a coating layer. Hence, the high level of dispersibility of the SiC particles at the time point of being produced is maintained even in the state of aluminum hydroxide-coated SiC particles. For this reason, it is possible to obtain a dispersion exhibiting extremely high dispersibility when the aluminum hydroxide-coated SiC particle powder to be produced is dispersed in a medium.

The water-based dispersion of SiC particles may be a commercially available product or a synthetic product. In the case of synthesizing (preparing) the water-based dispersion of SiC particles, the apparatus and method are not particularly limited and a known apparatus and a known method can be used. Incidentally, the synthesis (preparation) of the water-based dispersion of SiC particles is particularly preferably conducted in, for example, a step (E) to be described later.

The amount of sodium aluminate added is not particularly limited but is preferably 1 part by mass or more with respect to 100 parts by mass of the SiC particles. This is because the SiC particles can be sufficiently coated with $Al(OH)_3$ and the function derived from an aluminum-containing compound can be sufficiently exerted when the amount of sodium aluminate added is in this range. In addition, aggregation in the dispersing medium hardly occurs and favorable dispersibility is maintained even in the case of concurrently using the aluminum hydroxide-coated SiC particle powder and other particles to be described later in the dispersion containing a dispersing medium. Hence, a dispersion exhibiting higher dispersibility is obtained when the aluminum hydroxide-coated SiC particle powder and other particles are dispersed in a medium. From the same viewpoint, the amount of sodium aluminate added is more preferably 2.5 parts by mass or more. In addition, the amount of sodium aluminate added is not particularly limited but is preferably 800 parts by mass or less with respect to 100 parts by mass of the SiC particles. This is because the effect obtained by coating becomes constant when the coating proceeds to a certain extent and thus the economic efficiency and production efficiency are improved by setting the amount of sodium aluminate added to a predetermined amount or less. From the same viewpoint, the amount of sodium aluminate added is more preferably 600 parts by mass or less, more preferably 400 parts by mass or less, still more preferably 200 parts by mass or less, particularly preferably 50 parts by mass or less, and most preferably 10 parts by mass or less.

The raw material dispersion contains water as a dispersing medium. Water is preferably water containing impurities as little as possible. For example, water in which the total content of transition metal ions is 100 ppb or less is preferable. Here, the purity of water can be increased by, for example, operations such as removal of impurity ions using an ion exchange resin, removal of foreign substances using a filter, distillation, and the like. Specifically, as water, it is preferable to use, for example, deionized water (ion-exchanged water), pure water, ultrapure water, distilled water and the like.

The procedure and method for dispersing SiC particles in water and the procedure and method for dissolving sodium aluminate in water are not particularly limited, and known procedures and methods can be used.

The raw material dispersion may contain a dispersing medium other than water. The dispersing medium other than water may be an organic solvent for dispersion or dissolution of each component. In this case, preferred examples of the organic solvent to be used may include acetone, acetonitrile, ethanol, methanol, isopropanol, glycerin, ethylene glycol, propylene glycol and the like that are organic solvents miscible with water. In addition, the organic solvent may be used without being mixed with water to disperse or dissolve each component therein and then may be mixed with water. These organic solvents can be used singly or in combination of two or more kinds thereof.

Here, the content of water in the dispersing medium in the raw material dispersion is preferably 50% by mass or more, more preferably 80% by mass or more, and still more preferably 100% by mass (only water) (upper limit: 100% by mass) with respect to the total mass of the dispersing medium in the raw material dispersion from the viewpoint of more favorably progressing coating of the SiC particles with aluminum hydroxide.

The pH of the raw material dispersion to be obtained in the present step is not particularly limited but is preferably 10 or more and more preferably more than 10. In addition, it is more preferable that pH is 12 or less from a viewpoint of improving the reaction rate in the coating layer formation and of improving the productivity.

[Step (B)]

The method for producing an aluminum hydroxide-coated SiC particle powder according to an aspect of the present invention includes a step (B) of forming coated particles having a coating layer containing aluminum hydroxide on a surface of the SiC particles by adding an acid to the raw material dispersion prepared in the step (A) to adjust a pH to a range of 10 or more and 12 or less. In this step, aluminum hydroxide-coated SiC particles are produced.

The present step includes a stage of adding an acid to the raw material dispersion obtained in the step (A) in order to start pH maintenance.

The acid is not particularly limited, but examples thereof may include inorganic acids such as nitric acid, sulfuric acid, phosphoric acid, hydrochloric acid and the like (particularly strong inorganic acids such as nitric acid, sulfuric acid, hydrochloric acid and the like), organic acids such as acetic acid, citric acid, lactic acid, oxalic acid, phthalic acid and the like, and the like. Among these, the acid is preferably a strong inorganic acid, more preferably nitric acid, sulfuric acid, and hydrochloric acid, and still more preferably nitric acid from the viewpoint that it is possible to achieve the purpose in a smaller added amount and high purity products with low possibility of being contaminated with other elements are easily available.

The method for adding the acid to the raw material dispersion is not particularly limited, but the acid is preferably added as an aqueous solution of an acid. Here, the concentration of the aqueous solution of an acid is not particularly limited but is preferably 0.1% by mass or more. This is because the added amount is small and the productivity is high when the concentration of the aqueous solution of an acid is in this range. From the same viewpoint, the concentration of the aqueous solution of an acid is more preferably 0.5% by mass or more and still more preferably 1.0% by mass or more. In addition, the concentration of the aqueous solution of an acid is not particularly limited but is preferably 30% by mass or less. This is because the corrosive property is lower and the equipment load is smaller when the concentration of the aqueous solution of an acid is in this range. From the same viewpoint, the concentration of the aqueous solution of an acid is more preferably 20% by mass or less and still more preferably 10% by mass or less.

In addition, the rate (addition rate) of adding the aqueous solution containing an acid when attaining the pH at which the pH maintenance is started is not particularly limited and may be appropriately adjusted to a rate so that the pH can be adjusted to a range of 10 or more and 12 or less and the pH maintenance thereafter is easy.

In addition, the present step includes a stage of forming coated particles having a coating layer containing aluminum hydroxide on the surface of the SiC particles by adjusting the pH in a range of 10 or more and 12 or less.

In the present stage, the maintenance time of the state in which the pH is in a range of 10 or more and 12 or less is preferably 1 minute or more. This is because the SiC particles can be more sufficiently coated with aluminum hydroxide and the function derived from an aluminum-containing compound can be sufficiently imparted to the aluminum hydroxide-coated SiC particles when the maintenance time is in this range. In addition, this is because aggregation in the dispersing medium more hardly occurs and it is easier to obtain a dispersion exhibiting high dispersibility in the case of concurrently using the aluminum hydroxide-coated SiC particles and other particles to be described later. From the same viewpoint, the maintenance time is preferably 30 minutes or more, more preferably 50 minutes or more, and still more preferably 60 minutes or more. In addition, the maintenance time in the present stage is preferably 120 minutes or less. This is because the effect obtained by coating becomes constant when the coating proceeds to a certain extent and thus the economic efficiency and production efficiency are further improved when the maintenance time is in this range. From the same viewpoint, the maintenance time is preferably 110 minutes or less, more preferably 100 minutes or less, and still more preferably 90 minutes or less.

The pH in the present stage is 10 or more and 12 or less. It is impossible to sufficiently coat the SiC particles with aluminum hydroxide and to sufficiently impart the function derived from an aluminum-containing compound to the aluminum hydroxide-coated SiC particles when the pH is less than 10 or more than 12. In addition, aggregation is likely to occur in the dispersing medium and it is difficult to obtain a dispersion exhibiting high dispersibility in the case of concurrently using the aluminum hydroxide-coated SiC particles and other particles to be described later. The pH is more preferably 10.5 or more from the same viewpoint. In addition, the pH is more preferably 11.5 or less from the same viewpoint.

When maintaining a state in which the pH is in a range of 10 or more and 12 or less, the pH in this range may be maintained while gradually changing the pH by gradual addition of an aqueous solution containing an acid. As the kind and concentration of this aqueous solution containing an acid, the same conditions as those for the acid to be used at the time point at which the pH maintenance is started can be adopted. In addition, the rate (addition rate) of adding an aqueous solution containing an acid while the pH is maintained is not particularly limited and may be appropriately adjusted to a rate so that a state in which the pH is in a range of 10 or more and 12 or less can be maintained during the time required for a sufficient coating treatment.

By conducting the step (B), it is possible to obtain a dispersion containing an aluminum hydroxide-coated SiC particle powder and a dispersing medium. In other words, it is possible to produce an aluminum hydroxide-coated SiC particle powder in a state of being dispersed in a dispersing medium. Hence, as will be described later, another aspect of the present invention is also a method for producing a dispersion containing an aluminum hydroxide-coated SiC particle powder and a dispersing medium, by which an aluminum hydroxide-coated SiC particle powder is produced in a state of being dispersed in a dispersing medium.

(Production Method According to Third Aspect)

As described above, the third aspect of the present invention relates to a method for producing an aluminum hydroxide-coated SiC particle powder, which includes a step (C) of respectively preparing a raw material dispersion (1) which contains SiC particles, an alkali, and water and has a pH of from 9.0 to 12.0 and a raw material solution (2) containing sodium aluminate and water; and the coating step according to the first aspect of the present invention described above, namely a coating step of adjusting a pH of a dispersion containing SiC particles, sodium aluminate, and water to a range of from 9 to 12 and forming coated particles having a coating layer containing aluminum hydroxide on a surface of the SiC particles and in which the coating step is a step (D) of adding the raw material solution (2) and an acid to the raw material dispersion (1) to maintain a pH in a range of from 9.0 to 12.0 and forming coated particles having a coating layer containing aluminum hydroxide on a surface of the SiC particles.

In other word, the present aspect is a method for producing an aluminum hydroxide-coated SiC particle powder, which includes a step (C) of preparing a raw material dispersion (1) which contains SiC particles, an alkali, and water and has a pH of from 9.0 to 12.0 and a raw material solution (2) containing sodium aluminate and water;

and a step (D) of adding the raw material solution (2) and an acid to the raw material dispersion (1) to maintain a pH in a range of from 9.0 to 12.0 and forming coated particles having a coating layer containing aluminum hydroxide on a surface of the SiC particles.

Here, the aluminum hydroxide-coated SiC particle powder to be produced may be produced in a state of being dispersed in a dispersing medium or may be produced by conducting a step of removing the dispersing medium thereafter.

[Step (C)]

The method for producing an aluminum hydroxide-coated SiC particle powder according to an aspect of the present invention includes a step (C) of respectively preparing a raw material dispersion (1) which contains SiC particles, an alkali, and water and has a pH of from 9.0 to 12.0 and a raw material solution (2) containing sodium aluminate and water.

The method for preparing the raw material dispersion (1) is not particularly limited, but examples thereof may include a method in which an alkali is added to a water-based dispersion of SiC particles (a dispersion containing water as a dispersing medium, preferably a water dispersion), and the like.

The water-based dispersion of SiC particles may be a commercially available product or a synthetic product. In the case of synthesizing (preparing) the water-based dispersion of SiC particles, the apparatus and method are not particularly limited and a known apparatus and a known method can be used. Incidentally, the synthesis (preparation) of the water-based dispersion of SiC particles is particularly preferably conducted in, for example, a step (E) to be described later.

In the method for adding an alkali to the water-based dispersion of SiC particles in the method for preparing the raw material dispersion (1), the content of SiC particles in the water-based dispersion of SiC particles is not particularly limited but is preferably 8% by mass or more and more preferably 10% by mass or more with respect to the total mass of the water-based dispersion from the viewpoint of productivity. In addition, the content of SiC particles in the water-based dispersion of SiC particles is not particularly limited but is preferably 50% by mass or less, more preferably less than 50% by mass, still more preferably 30% by mass or less, yet still more preferably less than 30% by mass, particularly preferably 20% by mass or less, and most preferably less than 20% by mass with respect to the total mass of the water-based dispersion from the viewpoint of dispersibility.

In the method for preparing the raw material dispersion (1), the content of the SiC particles in the raw material dispersion (1) is not particularly limited but is preferably 8% by mass or more, more preferably more than 8% by mass, still more preferably 10% by mass or more, and particularly preferably more than 10% by mass with respect to the total mass of the raw material dispersion (1) from the viewpoint of productivity. In addition, the content of the SiC particles in the raw material dispersion (1) is not particularly limited but is preferably 50% by mass or less, more preferably 30% by mass or less, and still more preferably 20% by mass or less with respect to the total mass of the raw material dispersion (1) from the viewpoint of dispersibility.

The amount of an alkali used in the method for preparing the raw material dispersion (1) is not particularly limited and the used amount may be adjusted so that the pH of the dispersion becomes a predetermined value of from 9.0 to 12.0. The specific example of the range of the amount of an alkali used is not particularly limited but may include preferably a range of 0.0001 mol or more and 0.1 mol or less, more preferably a range of 0.0003 mol or more and 0.04 mol or less, still more preferably a range of 0.003 mol or more and 0.004 mol or less and the like.

Examples of the alkali to be used may include ammonia, potassium hydroxide, sodium hydroxide, ammonium hydrogen carbonate, ammonium carbonate, potassium hydrogen carbonate, potassium carbonate, sodium hydrogen carbonate, sodium carbonate, tetramethylammonium hydroxide, tetraethylammonium hydroxide, tetrabutylammonium hydroxide, methylamine, dimethylamine, trimethylamine, ethylamine, diethylamine, triethylamine, ethylenediamine, monoethanolamine, N-(β-aminoethyl)ethanolamine, hexamethylenediamine, diethylenetriamine, triethylenetetramine, anhydrous piperazine, piperazine hexahydrate, 1-(2-aminoethyl)piperazine, N-methylpiperazine, guanidine, imidazole, triazole and the like. These alkalis can be used singly or in mixture of two or more kinds thereof.

Here, the alkali is preferably added in the form of an aqueous solution, and the concentration of the alkali in the aqueous solution is not particularly limited but is preferably 0.1 M (where M=mol/L) or more with respect to the total volume of the aqueous solution. This is because it is possible to more efficiently conduct pH adjustment when the concentration of the alkali is in this range. From the same viewpoint, the concentration of the alkali in the aqueous solution is more preferably 0.25 M or more and more preferably 0.5 M or more with respect to the total volume of the aqueous solution. In addition, the concentration of the alkali in the aqueous solution is not particularly limited but is preferably 10 M or less. This is because it is possible to more accurately conduct pH adjustment when the concentration of the alkali in the aqueous solution is in this range. From the same viewpoint, the concentration of the alkali in the aqueous solution is more preferably 5 M or less, still more preferably 4 M or less, and particularly preferably 2 M or less.

Here, it is preferable that the SiC particles are maintained in a state of being dispersed in the dispersing medium from the generation thereof to the preparation of the raw material dispersion (1) in the step (C) although it is not particularly limited. Moreover, it is more preferable that the SiC particles are maintained in a state of being dispersed in the dispersing medium from the generation thereof to the coating thereof with a coating layer in the step (D) to be described later. The SiC particles can avoid aggregation due to drying as the SiC particles are maintained in a state of being dispersed in the dispersion during the time from the generation thereof to the coating thereof with a coating layer. Hence, the high level of dispersibility of the SiC particles at the time point of being generated is maintained even in the state of aluminum hydroxide-coated SiC particles. For this reason, it is possible to obtain a dispersion exhibiting extremely high dispersibility when the aluminum hydroxide-coated SiC particle powder to be produced is dispersed in a medium.

The raw material dispersion (1) contains water as a dispersing medium. Water is preferably water containing impurities as little as possible. For example, water in which the total content of transition metal ions is 100 ppb or less is preferable. Here, the purity of water can be increased by, for example, operations such as removal of impurity ions using an ion exchange resin, removal of foreign substances using a filter, distillation, and the like. Specifically, as water, it is preferable to use, for example, deionized water (ion-exchanged water), pure water, ultrapure water, distilled water and the like.

The procedure and method for dispersing SiC particles in water and the procedure and method for adding an alkali in water are not particularly limited, and known procedures and methods can be used.

The raw material dispersion (1) may contain a dispersing medium other than water. The dispersing medium other than water may be a mixed solvent of water and an organic solvent for dispersion or dissolution of each component. In this case, preferred examples of the organic solvent to be used may include acetone, acetonitrile, ethanol, methanol, isopropanol, glycerin, ethylene glycol, propylene glycol and the like that are organic solvents miscible with water. In addition, the organic solvent may be used without being mixed with water to disperse or dissolve each component therein and then may be mixed with water. These organic solvents can be used singly or in combination of two or more kinds thereof.

Here, the content of water in the dispersing medium in the raw material dispersion is preferably 50% by mass or more, more preferably 80% by mass or more, and still more preferably 100% by mass (only water) (upper limit: 100% by mass) with respect to the total mass of the dispersing medium in the raw material dispersion from the viewpoint of more favorably progressing coating of the SiC particles with aluminum hydroxide.

Here, the content of water in the raw material dispersion (1) is not particularly limited but is preferably 50% by mass or more, more preferably 70% by mass or more, and still more preferably 80% by mass or more (upper limit: 100% by mass) with respect to the total mass of the raw material dispersion (1) from the viewpoint of more favorably progressing coating of the SiC particles with aluminum hydroxide.

The pH of the raw material dispersion (1) to be obtained in the present step is from 9.0 to 12.0. Local aggregation at the acid dropping site is likely to occur in a case in which the pH is less than 9.0. On the other hand, generation of aluminum hydroxide particles (aluminum hydroxide single particles) is promoted in a case in which the pH exceeds 12.0. It is more preferable that the pH is more than 9.0 and 12.0 or less from the viewpoint of improving the rate of coating layer formation and the productivity.

The method for preparing the raw material solution (2) is not particularly limited, but examples thereof may include a method in which sodium aluminate is added to water and the like. The content of sodium aluminate in the raw material solution (2) is not particularly limited but is preferably 10% by mass or more and 50% by mass or less and more preferably 20% by mass or more and 40% by mass or less with respect to the total mass of the raw material solution (2).

[Step (D)]

The method for producing an aluminum hydroxide-coated SiC particle powder according to an aspect of the present invention includes a step (D) of adding the raw material solution (2) and an acid to the raw material dispersion (1) prepared in the step (C) to maintain a pH in a range of 10.0 or more and 12.0 or less and forming coated particles having a coating layer containing aluminum hydroxide on a surface of the SiC particles. In the present step (D), aluminum hydroxide-coated SiC particles are produced.

The method for adding the raw material solution (2) and an acid to the raw material dispersion (1) is not particularly limited as long as the pH can be maintained at from 9.0 to 12.0 (that is, the concentration of aluminate ions does not become excessive), and examples thereof may include a method in which the raw material solution (2) and an acid are simultaneously added and a method in which the raw material solution (2) and an acid are alternately added little by little.

The amount of the raw material solution (2) added is not particularly limited, but it is preferable to add the raw material solution (2) so that sodium aluminate is 1 part by mass or more with respect to 100 parts by mass of the SiC particles, and the amount of sodium aluminate is more preferably 5 parts by mass or more and still more preferably 10 parts by mass or more. This is because the SiC particles can be sufficiently coated with aluminum hydroxide (Al(OH)$_3$) and the function derived from an aluminum-containing compound can be sufficiently exerted when the amount of the raw material solution (2) added is in this range. In addition, the amount of the raw material solution (2) added is not particularly limited, but it is preferable to add the raw material solution (2) so that sodium aluminate is 800 parts by mass or less with respect to 100 parts by mass of the SiC particles, and the amount of sodium aluminate is more preferably 400 parts by mass or less and still more preferably 100 parts by mass or less. This is because the effect obtained by coating becomes constant when the coating proceeds to a certain extent and thus the economic efficiency and production efficiency are improved by setting the amount of the raw material solution (2) added to a predetermined amount or less. For example, in a preferred embodiment of the present invention, the amount of sodium aluminate used is from 1 to 100 parts by mass with respect to 100 parts by mass of the SiC particles.

The acid is not particularly limited, but examples thereof may include inorganic acids such as nitric acid, sulfuric acid, phosphoric acid, hydrochloric acid and the like (particularly strong inorganic acids such as nitric acid, sulfuric acid, hydrochloric acid and the like), organic acids such as acetic acid, citric acid, lactic acid, oxalic acid, phthalic acid and the like, and the like. Among these, the acid is preferably a strong inorganic acid and more preferably nitric acid, sulfuric acid, and hydrochloric acid from the viewpoint that it is possible to achieve the purpose in a smaller added amount and high purity products with low possibility of being contaminated with other elements are easily available.

The specific example of the range of the amount of the acid added is not particularly limited but may include preferably a range of 0.001 mol or more and 10 mol or less, more preferably a range of 0.005 mol or more and 5 mol or less, still more preferably a range of 0.01 mol or more and 1 mol or less and the like.

Here, the acid is preferably added in the form of an aqueous solution, and the concentration of the acid in the aqueous solution is not particularly limited but is preferably 1.0% by mass or more. This is because the added amount is small and the productivity is high when the concentration of the acid is in this range. From the same viewpoint, the concentration of the acid in the aqueous solution is more preferably 1.5% by mass or more and still more preferably 2.0% by mass or more. In addition, the concentration of the acid in the aqueous solution is not particularly limited but is preferably 30% by mass or less. This is because the corrosive property is lower and the equipment load is smaller when the concentration of the acid in the aqueous solution is in this range. From the same viewpoint, the concentration of the acid in the aqueous solution is more preferably 20% by mass or less and still more preferably 10% by mass or less.

In addition, the rate (addition rate) of adding the raw material solution (2) and the acid is not particularly limited and may be appropriately adjusted so that the pH is in a range of pH 9.0 or more and 12.0 or less and the subsequent maintenance of pH is easy.

In addition, the present step includes a stage of forming coated particles having a coating layer containing aluminum hydroxide on the surface of the SiC particles by adjusting the pH to a range of 9.0 or more and 12.0 or less.

In the present stage, the maintenance time of the state in which the pH is in a range of 9.0 or more and 12.0 or less is preferably 1 minute or more. This is because the SiC particles can be more sufficiently coated with aluminum hydroxide and the function derived from an aluminum-containing compound in the aluminum hydroxide-coated SiC particles is further improved when the maintenance time is in this range. In addition, this is because aggregation in the dispersing medium hardly occurs and it is possible to obtain a dispersion exhibiting high dispersibility in the case of concurrently using the aluminum hydroxide-coated SiC particles and other particles to be described later. From the same viewpoint, the maintenance time is preferably 30 minutes or more, more preferably 50 minutes or more, and still more preferably 60 minutes or more. In addition, the maintenance time in the present stage is preferably 200 minutes or less. This is because the effect obtained by coating becomes constant when the coating proceeds to a certain extent and thus the economic efficiency and production efficiency are further improved when the maintenance time is in this range. From the same viewpoint, the maintenance time is more preferably 150 minutes or less, still more preferably 120 minutes or less, and particularly preferably 90 minutes or less.

The pH in the present stage is 9.0 or more and 12.0 or less. The aggregation of SiC particles occurs and it is difficult to maintain uniform dispersibility when the pH is less than 9.0. There is the danger that a great number of aluminum hydroxide particles is formed when the pH is more than 12.0, that is, in a case in which sodium aluminate is added at once.

By conducting the step (D), it is possible to obtain a dispersion containing an aluminum hydroxide-coated SiC particle powder and a dispersing medium. In other words, it is possible to produce an aluminum hydroxide-coated SiC particle powder in a state of being dispersed in a dispersing medium. Hence, as will be described later, another aspect of the present invention is also a method for producing a dispersion containing an aluminum hydroxide-coated SiC particle powder and a dispersing medium, by which an aluminum hydroxide-coated SiC particle powder is produced in a state of being dispersed in a dispersing medium.

(Other Steps)

The method for producing an aluminum hydroxide-coated SiC particle powder according to the second aspect may further include steps other than the step (A) and the step (B) or may further include stages according to other operations in the step (A) and the step (B). In addition, the method for producing an aluminum hydroxide-coated SiC particle powder according to the third aspect may further include steps other than the step (C) and the step (D) or may further include stages according to other operations in the step (C) and the step (D).

The other steps and operations are not particularly limited, but examples thereof may include preparation of a dispersion containing SiC particles and a dispersing medium by generating the SiC particles in the dispersing medium before the step (A) according to the second aspect or the step (C) according to the third aspect or in the step (A) according to the second aspect or the step (C) according to the third aspect, and the like. Among these, in the production method according to the second aspect, it is preferable to further include a step (E) of preparing a dispersion of SiC particles (dispersion of particles before being coated) containing SiC particles (particles before being coated) and a dispersing medium by generating the SiC particles in the dispersing medium before the step (A) and to maintain a state in which the SiC particles are dispersed in a dispersing medium from the generation of SiC particles in the step (E) to the coating thereof in the step (B). In addition, among these, in the production method according to the third aspect, it is preferable to further include a step (E) of preparing a dispersion of SiC particles (dispersion of particles before being coated) containing SiC particles (particles before being coated) and a dispersing medium by generating the SiC particles in the dispersing medium before the step (C) and to maintain a state in which the SiC particles are dispersed in a dispersing medium from the generation of SiC particles in the step (E) to the end of the step (D). Here, the method for generating SiC particles in a dispersing medium is not particularly limited, and known methods can be used. In addition, as the dispersing medium in the step (E), those to be used in the preparation of the raw material dispersion in the step (A) according to the second aspect or the step (C) according to the third aspect can be used singly or in mixture of two or more kinds thereof. Among these, those containing water are preferable and water (preferably pure water) is more preferable.

Examples of a method for preparing a dispersion of SiC particles (dispersion of particles before being coated) containing SiC particles (particles before being coated) and a dispersing medium according to the step (E) and a preferred method in which the SiC particles is not put in a dry state may include the following methods. First, SiC particles having an average primary particle size larger than the intended average primary particle size of SiC particles which are particles before being coated (also referred to as a SiC coarse powder in the present specification) are prepared. Subsequently, the SiC coarse powder and a dispersing medium are charged into a pulverization apparatus, and pulverization is conducted under pulverization conditions in which recovery of SiC particles having an intended average primary particle size is possible. Here, examples of the pulverization apparatus may include a ball mill, a roller mill, a jet mill, a hammer mill, a pin mill, an attritor and the like. Among these, it is preferable to conduct pulverization using a ball mill from the viewpoint of the uniformity of the SiC particles after being pulverized and the improvement in the dispersibility of the particles in the dispersing medium. The ball mill is not particularly limited, but for example, a pot mill rotary table with a product name of ANZ-10D manufactured by Tech-Jam Co., Ltd. and the like can be used. In addition, the ball to be used in the ball mill is not particularly limited, but examples thereof may include alumina balls and the like. The diameter of the ball may be appropriately selected depending on the average primary particle sizes and the like of the SiC coarse powder and the intended SiC particles. In addition, the pulverization conditions can be determined by confirming the relation between, for example, the mass ratio of the SiC coarse powder and the dispersing medium to be charged, the pulverization time, the number of revolutions or the like in the pulverization apparatus to be used and the average primary particle size and particle size distribution of the SiC particles after being pulverized in advance. The amount of the SiC coarse powder and dispersing medium to be charged is not particularly limited, but the amount of the SiC coarse powder charged is preferably 20% by mass or less, more preferably less than 20% by mass, still more preferably 18% by mass or less, and particularly preferably 16% by mass or less (lower limit: more than 0% by mass) with respect to the total mass of the SiC coarse powder and the dispersing medium from the viewpoint of the uniformity of the SiC particles after being pulverized and production efficiency. Subsequently, without passing through a drying step, the dispersion containing the SiC particles after being pulverized and the dispersing medium may be charged from the ball mill into a conical type facility which is for conducting classification and is called a classification tower and only the portion of a dispersion containing the SiC particles of the intended particle size portion (particles before being coated) and the dispersing medium may be recovered utilizing the difference in settling time of particles, if necessary. However, classification may not be conducted in a case in which classification is not particularly necessary. Thereafter, the dispersion containing the SiC particles (particles before being coated) and the dispersing medium after being recovered is allowed to still stand in a beaker to completely settle the SiC particles, and then the dispersing medium of the supernatant portion is recovered so that the concentration of the SiC particles in the dispersion becomes a desired concentration, whereby a dispersion of SiC particles (dispersion of particles before being coated) containing SiC particles and a dispersing medium can be prepared.

Incidentally, in the second aspect, as other steps and operations, steps and operations of conducting mechanical pulverization for further improvement in the dispersibility, ultrasonic dispersion and the like may be included before the step (A), after the step (A), after the step (B), or in the step (A) or step (B) other than the step (E) described above. In addition, in the third aspect, as other steps and operations, steps and operations of conducting mechanical pulverization for further improvement in the dispersibility, ultrasonic dispersion and the like may be included before the step (C), after the step (C), after the step (D), or in the step (C) or step (D) other than the step (E) described above. However, an aluminum hydroxide-coated SiC particle powder to be produced itself exhibits sufficient dispersibility in a medium even if the method for producing an aluminum hydroxide-coated SiC particle powder according to an aspect of the present invention does not include these steps and operations. Hence, it is particularly preferable that the method for producing an aluminum hydroxide-coated SiC particle powder according to an aspect of the present invention does not include mechanical pulverization and ultrasonic dispersion as a step and an operation for further improvement in the dispersibility other than the step (E) from the viewpoint of improvement in productivity. Incidentally, in the case of not including a step and an operation for further improvement in the dispersibility other than the step (E), it is most preferable that a state in which the SiC particles are dispersed in the dispersing medium are maintained from the generation of SiC particles to the coating thereof with a coating layer in the step (B) according to the second aspect or the step (D) according to the third aspect as described above. In this case, both dispersibility and productivity can be achieved at extremely high levels.

In addition, other steps and operations are not particularly limited, but preferred examples thereof may include a step and an operation of removing components other than the aluminum hydroxide-coated SiC particles from the product powder, a step and an operation of replacing the dispersing medium in the dispersion containing the product powder with a desired dispersing medium, and the like after the step (B) according to the second aspect or the step (D) according to the third aspect. In addition, examples thereof may include a step and an operation of volatilizing the dispersing medium in the dispersion containing the product to obtain an aluminum hydroxide-coated SiC particle powder in a powder form (dry state), and the like.

Incidentally, in the production of an aluminum hydroxide-coated SiC particle powder according to an aspect of the present invention, the solution or dispersion to be used in each step may contain other components as long as the effects of the present invention are not impaired.

(Method for Producing Dispersion)

Another aspect of the present invention relates to a method for producing a dispersion containing an aluminum hydroxide-coated SiC particle powder and a dispersing medium by which an aluminum hydroxide-coated SiC particle powder is produced in a state of being dispersed in a dispersing medium in the method for producing an aluminum hydroxide-coated SiC particle powder described above.

The dispersion to be produced by the production method according to an aspect of the present invention exhibits high dispersibility. For this reason, the dispersion to be produced by the production method according to an aspect of the present invention can be preferably used in various uses such as a raw material for forming a formed body exhibiting high uniformity, a polishing composition exhibiting high polishing property, and the like.

In the method for producing a dispersion containing an aluminum hydroxide-coated SiC particle powder and a dispersing medium according to an aspect of the present invention, it is preferable to further include a step (E) of preparing a dispersion of SiC particles containing SiC particles (particles before being coated) and a dispersing medium (dispersion of particles before being coated) by generating the SiC particles in the dispersing medium before the step (A) according to the second aspect and to maintain a state in which the SiC particles are dispersed in a dispersing medium from the generation of SiC particles in the step (E) to the coating thereof in the step (B) according to the second aspect. In this case, it is more preferable to maintain a state in which the aluminum hydroxide-coated SiC particles are dispersed in a dispersing medium from the formation of the aluminum hydroxide-coated SiC particles to the production of the dispersion in the step (B) according to the second aspect. In addition, in the method for producing a dispersion containing an aluminum hydroxide-coated SiC particle powder and a dispersing medium according to an aspect of the present invention, it is preferable to further include a step (E) of preparing a dispersion of SiC particles containing SiC particles (particles before being coated) and a dispersing medium (dispersion of particles before being coated) by generating the SiC particles in the dispersing medium before the step (C) according to the third aspect and to maintain a state in which the SiC particles are dispersed in a dispersing medium from the generation of SiC particles in the step (E) to the coating thereof in the step (D) according to the third aspect. In this case, it is more preferable to maintain a state in which the aluminum hydroxide-coated SiC particles are dispersed in a dispersing medium from the formation of the aluminum hydroxide-coated SiC particles to the production of the dispersion in the step (D) according to the third aspect.

(Dispersing Medium)

The dispersion to be produced by the production method according to an aspect of the present invention contains a dispersing medium. The dispersing medium has a function of dispersing or dissolving each component. The dispersing medium may be a dispersing medium present immediately after the coating treatment in the step (B) according to the second aspect or the step (D) according to the third aspect or a dispersing medium replaced by a step and an operation of replacing the dispersing medium after the step (B) or (D). The dispersing medium preferably contains water and is more preferably composed of only water. In addition, the dispersing medium may be an organic solvent for dispersion or dissolution of each component. In this case, preferred examples of the organic solvent to be used may include acetone, acetonitrile, ethanol, methanol, isopropanol, glycerin, ethylene glycol, propylene glycol and the like that are organic solvents miscible with water. The dispersing medium may be a mixed solvent of water and an organic solvent. In addition, the organic solvent may be used without being mixed with water to disperse or dissolve each component therein and then may be mixed with water. These organic solvents can be used singly or in combination of two or more kinds thereof.

Water is preferably water containing impurities as little as possible. For example, water in which the total content of transition metal ions is 100 ppb or less is preferable. Here, the purity of water can be increased by, for example, operations such as removal of impurity ions using an ion exchange resin, removal of foreign substances using a filter, distillation, and the like. Specifically, as water, it is preferable to use, for example, deionized water (ion-exchanged water), pure water, ultrapure water, distilled water and the like.

(Other Components)

The dispersion to be produced by the production method according to an aspect of the present invention may contain other components as long as the effects of the present invention are not impaired.

(pH)

The pH of the dispersion to be produced by the production method according to an aspect of the present invention is not particularly limited but is preferably the same as the preferred range of the pH of the isoelectric point of the aluminum hydroxide-coated SiC particle powder described above from the viewpoint of exhibiting high dispersibility.

(Other Steps)

The method for producing a dispersion according to an aspect of the present invention may further include steps other than those described in the method for producing an aluminum hydroxide-coated SiC particle powder described above. In a case in which the aluminum hydroxide-coated SiC particle powder is produced in a powder form (dry state), examples of other steps may include a step of mixing the powdery aluminum hydroxide-coated SiC particle powder with a dispersing medium, and the like. Here, the method for mixing the powdery aluminum hydroxide-coated SiC particle powder with a dispersing medium is not particularly limited, and a known method can be used.

(Application Example)

The dispersion described above may be used in various uses as it is but may be used as a raw material for other materials. Hence, still another aspect of the present invention is a method for producing an applied dispersion, which includes producing the dispersion by the method for producing a dispersion described above and further adding other additives to the dispersion obtained.

The applied dispersion to be produced by the production method according to an aspect of the present invention exhibits high dispersibility even in a state of containing an aluminum hydroxide-coated SiC particle powder and other additives. For this reason, the applied dispersion to be produced by the production method according to an aspect of the present invention can be preferably used in various uses such as a raw material for forming a formed body exhibiting high uniformity, a polishing composition exhibiting high polishing property, and the like.

(Other Additives)

Other additives are not particularly limited but are particularly preferably other particles or a pH adjusting agent.

[Other Particles]

Other particles which can be arbitrarily added are not particularly limited, but particles of which the pH of the isoelectric point is 5 or more are preferable. Here, it is preferable that the other particles which can be arbitrarily added do not include the aluminum hydroxide particles described above. In the case of concurrently using the aluminum hydroxide-coated SiC particle powder according to an aspect of the present invention and the other particles to be described later in a dispersion containing a medium as well, aggregation hardly occurs and favorable dispersibility is maintained. Hence, a dispersion exhibiting high dispersibility can be obtained. From the same viewpoint, other particles are more preferably particles of which the pH of the isoelectric point is 5 or more and 11 or less.

Here, the absolute value of the difference between the pH of the isoelectric point of other particles and the pH of the isoelectric point of the aluminum hydroxide-coated SiC particles is preferably as small as possible but is preferably 2 or less, more preferably 1.5 or less, and still more preferably 1 or less (lower limit: 0). This is because particles of which the pHs of the isoelectric points are close to each other hardly cause aggregation.

The particles of which the pH of the isoelectric point is 5 or more and 11 or less are not particularly limited, but examples thereof may include alumina, copper oxide, iron oxide, nickel oxide, tin oxide, cadmium oxide, zinc oxide, zirconium oxide, zirconium oxide and the like.

[pH Adjusting Agent]

The pH adjusting agent is not particularly limited, and known pH adjusting agents capable of attaining a desired pH can be appropriately used. Here, among these, it is preferable to use known acids, bases, salts, amines, chelating agents and the like as the known pH adjusting agents.

[pH]

The pH of the applied dispersion to be produced by the production method according to an aspect of the present invention is not particularly limited but is preferably the same as the preferred range of the pH of the isoelectric point of the coated particle powder containing aluminum hydroxide-coated SiC particles described above from the viewpoint of exhibiting high dispersibility.

EXAMPLES

The present invention will be described in more detail with reference to the following Examples and Comparative Examples. However, the technical scope of the present invention is not limited to the following Examples. Incidentally, "%" and "parts" mean "% by mass" and "parts by mass", respectively, unless otherwise stated.

Example 1: Method for Producing Aluminum
Hydroxide-Coated SiC Particle Powder According
to Second Aspect of Present Invention <Production of Powder>
(Production of Powder 1)
[Preparation of Water Dispersion of SiC Particles]

A SiC coarse powder having an average primary particle size of 0.7 μm and pure water were charged into a ball mill so that the amount of SiC coarse powder charged was 18% by mass with respect to the total mass of the SiC coarse powder and the water and subjected to pulverization under pulverization conditions in which recovery of SiC particles having an intended average primary particle size was possible. Subsequently, without passing through a drying step, the water dispersion of SiC particles after being pulverized were charged from the ball mill into a conical type facility which was for conducting classification and was called a classification tower, and only the portion of water dispersion of SiC particles (SiC particles 1) of the intended particle size portion were recovered utilizing the difference in settling time of particles. Thereafter, the water dispersion of SiC particles 1 after being recovered was allowed to still stand in a beaker to completely settle the SiC particles 1, and then water of the supernatant portion was recovered so that the concentration of the SiC particles 1 in the water dispersion became 20% by mass, thereby preparing a 20% by mass water dispersion of SiC particles 1 (dispersion of particles before being coated).

[Preparation of Powder]

To 100 parts by mass of the SiC particles 1 in the 20% by mass water dispersion of SiC particles 1, 50 parts by mass of sodium aluminate was added, and this was dissolved in the water dispersion while stirring the mixture, thereby obtaining a raw material dispersion having a pH of 13.1. Subsequently, a 9.9% by mass aqueous solution of nitric acid was added to the raw material dispersion obtained to adjust the pH to 11.5, then the dispersion obtained was maintained at a pH of from 10.6 to 11.5 for 60 minutes, and then a 9.9% by mass aqueous solution of nitric acid was further added thereto to adjust the pH to 10. Thereafter, pure water was added to the dispersion obtained so that the concentration (content) of the SiC particles with respect to the total mass of the dispersion became 10% by mass, thereby preparing a dispersion 1 containing a powder 1.

Incidentally, the SiC particles 1 were maintained in a state of being dispersed in the dispersing medium from the generation of the particles to the formation of the powder 1. In addition, in the present production, the time during which the pH of the dispersion after the addition of sodium aluminate was 10 or more and 12 or less was 70 minutes.

(Production of Powder 2)

A dispersion 2 containing a powder 2 was prepared in the same manner as in the production of powder 1 described above except that 5 parts by mass of sodium aluminate was added to 100 parts by mass of the SiC particles 1. Incidentally, in the present production, the time during which the pH of the dispersion after the addition of sodium aluminate was 10 or more and 12 or less was the same as the powder 1 described above.

(Production of Powder 3)

A dispersion 3 containing a powder 3 was prepared in the same manner as in the production of powder 1 described above except that 2.5 parts by mass of sodium aluminate was added to 100 parts by mass of the SiC particles 1. Incidentally, in the present production, the time during which the pH of the dispersion after the addition of sodium aluminate was 10 or more and 12 or less was the same as the powder 1 described above.

(Production of Powder 4)

A dispersion 4 containing a powder 4 was prepared in the same manner as in the production of powder 1 described above except that the SiC coarse powder to be used was changed to one having an average primary particle size of 1.3 μm and the pulverization conditions of SiC coarse powder were changed to conditions for obtaining SiC particles 2 having a larger intended average primary particle size. Incidentally, the SiC particles 2 were maintained in a state of being dispersed in the dispersing medium from the generation of the particles to the formation of the powder 4. In addition, in the present production, the time during which the pH of the dispersion after the addition of sodium aluminate was 10 or more and 12 or less was the same as the powder 1 described above.

(Production of Powder 5)

A dispersion 5 containing a powder 5 was prepared in the same manner as in the production of powder 1 described above except that sodium aluminate was changed to aluminum isopropoxide.

(Production of Powder 6)

After the production of the powder 1, the obtained dispersion 1 containing the powder 1 was dried at 105° C. for 12 hours. Thereafter, the powder after being dried was fired at 1000° C. for 4 hours, thereby preparing a powder. Thereafter, pure water was added so that the concentration (content) of the SiC particles with respect to the total mass of the dispersion obtained became 10% by mass, thereby preparing a dispersion 6 containing a powder 6.

The raw materials used in the production of the dispersions containing the respective powders described above are presented in Table 1 below.

<Analysis of Powder>
(Analysis of Composition and Structure)

About 2 mL of the dispersion containing the powder obtained above was collected and dropped onto a filter (Nuclepore 5 μm) (manufactured by WHATMAN). Subsequently, suction filtration was conducted, then the powder was washed on the filter using 10 mL of pure water, and the powder was dried. Thereafter, the powder after being dried was collected on a Si wafer and subjected to SEM (Scanning Electron Microscope)-EDX (Energy Dispersive X-ray Spectroscopy) observation using a scanning electron microscope SU-8000 manufactured by Hitachi High-Technologies Corporation.

In addition, each powder after being dried was collected on a carbon tape and subjected to EELS (Electron Energy Loss Spectroscopy) analysis using TITAN 80-300 manufactured by FEI.

Here, in the SEM-EDX observation of powder, C, Al, and O were selected as the elements to be observed, and it was judged that the SiC particles were coated with a component containing Al and O in a case in which an EDX spectrum of Al was observed and it was confirmed that the position at which the EDX spectra of C, Al, and O were observed and the position at which the particles were observed in the SEM observation image clearly correspond to each other.

In addition, in the EELS analysis of powder, it can be judged that the component containing Al and O contains Al(OH)$_3$ in a case in which it has been confirmed that the EELS spectrum observed has a spectral shape (shape different from the spectra of Al and other compounds containing Al and O) unique to the EELS standard spectrum of aluminum hydroxide (Al(OH)$_3$).

For each powder, the presence or absence of the coating layer and the compounds contained in the coating layer are presented in Table 2 below.

(Measurement of Zeta Potential)

The dispersion which contained the powder and was obtained above, and a 20% by mass water dispersion of SiC particles adjusted in the same manner as that used in the production of the dispersion were diluted with pure water, and 0.01 to 0.1 M NaOH and HCl were used as pH adjusting agents to prepare each solution for zeta potential measurement having a pH of from 3.0 to 10.0 in 1.0 scale. Here, the pH was measured using a pH meter (model number: F-71) manufactured by Horiba, Ltd.

The zeta potential was measured using a zeta potential measurement apparatus (trade name "Zetasizer nanoZSP") manufactured by Malvern Instruments. Here, the zeta potential was measured using a refractive index of 1.760 and an absorptance of 0.300 which were representative values of general alumina as the measured particle conditions.

The pH to be the isoelectric point of the powder (pH of isoelectric point) was calculated by the equation described above from the pHs before and after the sign of the zeta potential changed and the zeta potentials at the pHs before and after the change, which were attained by subjecting the solution for zeta potential measurement which had a pH of from 3.0 to 10.0 in 1.0 scale and was prepared above to the measurement.

The value of pH to be the isoelectric point of each powder (denoted as "pH of isoelectric point" in Table 2 below) is presented in Table 2 below.

(Average Primary Particle Size of SiC Particles)

The average primary particle size (nm) of the SiC particles was calculated using the value of the true density of the SiC particles based on the average value of the specific surface area (SA) of the SiC particles calculated from the value continuously measured 3 to 5 times by a BET method for about 0.2 g of the SiC particles on the assumption that the shape of the SiC particles was a true sphere.

[True Density]

The true density (g/cm$^3$) was measured as follows. First, 30 g of SiC particles were placed in a beaker, then 70 g of pure water was placed therein, and stirring of the mixture was conducted. Subsequently, the water dispersion liquid of SiC particles was placed in a crucible so as to be about 15 g as solids (powder), and the moisture was evaporated at about 200° C. using a commercially available hot plate. Furthermore, in order to remove the moisture remaining in the voids of the SiC particles, a heat treatment was conducted at 300° C. for 1 hour using an electric furnace (firing furnace manufactured by Advantech Co., Ltd.), and the dry SiC particles after being subjected to the treatment were crushed in a mortar. Next, 10 g of the dry SiC particles fabricated above was placed in a 100-ml pycnometer (Wa (g)) of which the weight was measured in advance using a precision balance (GH-202 manufactured by A&D Company, Limited), the weight of the pycnometer was measured (Wb (g)), then 20 ml of ethanol was added thereto, and degassing was conducted for 30 minutes in a depressurized desiccator. Thereafter, the interior of the pycnometer was filled with ethanol, the pycnometer was stoppered, and the weight of the pycnometer was measured (Wc (g)). The contents in the pycnometer after being subjected to the weight measurement of SiC particles were discarded, the pycnometer was washed and then filled with ethanol, and the weight of the pycnometer was measured (Wd (g)). The true density was calculated from these weights and the temperature (t (° C.)) of ethanol at the time of measurement by the following Equation 1 and the following Equation 2.

[Math. 2]

$$Ld = 0.80653 - 0.000867 \times t \quad \text{Equation 1:}$$

Where Ld denotes the specific gravity (g/cm$^3$) of ethanol at t° C.

[Math. 3]

$$Sg = (Wb - Wa)/(Wd - Wc + Wb - Wa) \times Ld \quad \text{Equation 2:}$$

Where, Sg denotes the true density (g/cm$^3$) of the SiC particles;

Wa denotes the weight of the pycnometer (g);

Wb denotes the total weight (g) of the sample (dry SiC particles) and the pycnometer;

Wc denotes the total weight (g) of the sample (dry SiC particles), ethanol, and the pycnometer;

Wd denotes the total weight (g) of ethanol and the pycnometer; and

Ld denotes the specific gravity (g/cm$^3$) of ethanol determined by Equation 1 above.

[BET Specific Surface Area]

The BET specific surface area (m$^2$/g) was measured as follows. First, SiC particles were crushed in a mortar, and about 0.2 g of the SiC particles were placed in a cell (Wa' (g)) of which the weight was measured in advance, and the weight of the cell was measured (Wb' (g)), and then the cell was maintained at a temperature of 180° C. in the heating section of a specific surface area meter (flowsorb II 2300, manufactured by Shimadzu Corporation) for 5 minutes or more. Thereafter, the cell was mounted on the measurement section, and the adsorption area (A [m$^2$]) at the time of degassing was measured. The specific surface area SA [m$^2$/g] was determined by the following Equation 3 using the A value.

[Math. 4]

$$SA = A/(Wb' - Wa') \quad \text{Equation 3:}$$

Where, SA denotes the BET specific surface area (m$^2$/g) of SiC particles;

A denotes the adsorption area (m$^2$) at the time of degassing;

Wa' denotes the weight (g) of the cell;

Wb' denotes the total weight (g) of the sample (dry SiC particles) and the cell.

The average primary particle size of each of the SiC particles is presented in Table 2.

(Average Secondary Particle Size and Particle Size Distribution)

The average secondary particle sizes and particle size distributions of the SiC particles and the powder obtained above were measured using a scattering particle size distribution measurement apparatus LA-950 manufactured by Horiba, Ltd.

For the SiC particles, the measurement was conducted using a 10% by mass water dispersion of SiC particles. Here, for the SiC particles 1 and the SiC particles 2, a 20% by mass water dispersion of SiC particles was prepared in the same manner as the production of powder described above and this was diluted with pure water to obtain a 10% by mass water dispersion of SiC particles. At this time, a state in which the SiC particles were dispersed in the dispersing medium was maintained from the generation of the SiC particles to the preparation of the 10% by mass water dispersion of the SiC particles. In addition, for the powder obtained above, the dispersion liquid containing the powder was diluted with pure water until the concentration was displayed as an appropriate concentration on the apparatus and then subjected to the measurement.

The average secondary particle sizes of each of the SiC particles and each of the powders are presented in Table 2 below.

(Evaluation on Dispersibility)

The ratio of the average secondary particle size of the powder obtained above to the average secondary particle size of the SiC particles (the ratio of the average secondary particle size to the SiC particles) was used as a criterion for the evaluation on dispersibility.

In addition, the ratio of the average secondary particle size of the powder obtained above to the average primary particle size of the SiC particles (the ratio of the average secondary particle size to the average primary particle size of the SiC particles) was also confirmed as a criterion for the evaluation on dispersibility.

The calculation results of these for each of the SiC particles and each of the powders obtained above are presented in Table 2 below.

TABLE 1

Raw materials of each powder

| Powder | SiC particles (particles before being coated) | Raw material of coating layer | Amount of raw material of coating layer added to 100 parts by mass of SiC particles (parts by mass) |
|---|---|---|---|
| 1 | SiC particle 1 | Sodium aluminate | 50 |
| 2 | SiC particle 1 | Sodium aluminate | 5 |
| 3 | SiC particle 1 | Sodium aluminate | 2.5 |
| 4 | SiC particle 2 | Sodium aluminate | 50 |
| 5 | SiC particle 1 | Aluminum isopropoxide | 50 |
| 6 | SiC particle 1 | Sodium aluminate (formed into aluminum hydroxide coating layer and then fired at high temperature) | 50 |

TABLE 2

Properties of each SiC particle and each powder

| | Coating layer | | pH of isoelectric point at zeta potential | Average primary particle size (nm) | Average secondary particle size (nm) | Ratio of average secondary particle size to average primary particle size of SiC particles | Ratio of average secondary particle size to SiC particles | Remarks |
|---|---|---|---|---|---|---|---|---|
| | Presence or absence | Aluminum compound | | | | | | |
| SiC particle 1 | Absent | Absent | 4.4 | 60.3 | 355.2 | | | Reference Example |
| SiC particle 2 | Absent | Absent | 4.3 | 501.2 | 1769.2 | | | Reference Example |
| Powder 1 | Present | Al(OH)$_3$ | 6.7 | Unmeasured | 539.2 | 8.94 | 1.52 | Example |
| Powder 2 | Present | Al(OH)$_3$ | 6.4 | Unmeasured | 390.1 | 6.47 | 1.10 | Example |
| Powder 3 | Present | Al(OH)$_3$ | 6.2 | Unmeasured | 383.7 | 6.36 | 1.08 | Example |
| Powder 4 | Present | Al(OH)$_3$ | 5.8 | Unmeasured | 1813.0 | 3.62 | 1.02 | Example |
| Powder 5 | Absent | Absent | 4.4 | Unmeasured | 621.3 | 10.30 | 1.75 | Comparative Example |
| Powder 6 | Present | Al$_2$O$_3$ | 6.7 | Unmeasured | 3918.3 | 64.98 | 11.03 | Comparative Example |

From the results of Table 2, it has been confirmed that the powders 1 to 4 which have been produced by the production method according to the second aspect of the present invention and are contained in the dispersions 1 to 4 according to Examples are aluminum hydroxide-coated SiC particle powders and the dispersibility thereof in the dispersing medium is extremely favorable. On the other hand, it has been confirmed that a coating layer is not formed on the powder 5 which has been produced by a production method to be out of the scope of the present invention and is contained in the dispersion 5 according to Comparative Example and it has been indicated that the powder 5 does not have a function derived from an aluminum compound. In addition, it has been confirmed that the powder 6 which is contained in the dispersion 6 according to Comparative Example and in which aluminum hydroxide in the coating layer has been converted into alumina after firing at a high temperature is remarkably inferior in dispersibility.

In addition, in the case of particles of which the pHs of the isoelectric points are close to each other, it is known that aggregation hardly occurs when a dispersion liquid is prepared by concurrently using these and favorable dispersibility is maintained. Hence, aluminum hydroxide-coated SiC particle powders having an isoelectric point of 4.5 or more such as the powders 1 to 4 which have been produced by the production method according to the second aspect of the present invention and are contained in the dispersions 1 to 4 according to Examples can realize extremely favorable dispersibility and high uniformity even in an applied dispersion liquid in which particles having an isoelectric point of 5 or more are concurrently used as another component.

Example 2: Method for Producing Aluminum Hydroxide-Coated SiC Particle Powder According to Third Aspect of Present Invention <Production of Powder>
(Production of Powder 2-1)

A 20% by mass water dispersion liquid of SiC particles A (GC #40000 manufactured by Fujimi Incorporated, powder) was prepared, and a 1 M aqueous solution of NaOH was added thereto so as to have a pH of 10.0. Subsequently, a 30% by mass water dispersion liquid of sodium aluminate was prepared, and the water dispersion liquid of sodium aluminate in an amount corresponding to 50 parts by mass (in terms of solids) of sodium aluminate with respect to 100 parts by mass of the SiC particles A and 9.9% by mass nitric acid were added to the water dispersion liquid of SiC particles A over 45 minutes while stirring the mixture so that the pH was maintained at from 9.0 to 12.0. Thereafter, the mixture was further stirred for 45 minutes, then 9.9% by mass nitric acid was added thereto so as to have a pH of 10.5 to obtain a dispersion liquid containing a powder 2-1, whereby the powder 2-1 was prepared.

(Production of Powder 2-2)

A powder 2-2 was prepared in the same manner as in the production of the powder 2-1 except that the amount of the water dispersion liquid of sodium aluminate added was changed to 25 parts by mass (in terms of solids) of sodium aluminate with respect to 100 parts by mass of the SiC particles A.

(Production of Powder 2-3)

A powder 2-3 was prepared in the same manner as in the production of the powder 2-1 except that the amount of the water dispersion liquid of sodium aluminate added was changed to 12.5 parts by mass (in terms of solids) of sodium aluminate with respect to 100 parts by mass of the SiC particles A.

(Production of Powder 2-4)

A powder 2-4 was prepared in the same manner as in the production of the powder 2-2 except that the acid used was changed from 9.9% by mass nitric acid to 9.9% by mass hydrochloric acid.

(Production of Powder 2-5)

A powder 2-5 was prepared in the same manner as in the production of the powder 2-4 except that the amount of the water dispersion liquid of sodium aluminate added was changed to 12.5 parts by mass (in terms of solids) of sodium aluminate with respect to 100 parts by mass of the SiC particles A.

(Production of Powder 2-6)

A powder 2-6 was prepared in the same manner as in the production of the powder 2-4 except that the amount of the water dispersion liquid of sodium aluminate added was changed to 5 parts by mass (in terms of solids) of sodium aluminate with respect to 100 parts by mass of the SiC particles A.

(Production of Powder 2-7)

A 20% by mass water dispersion liquid of SiC particles A was prepared, and a 1 M aqueous solution of NaOH was added thereto so as to have a pH of 10.0. Subsequently, solid sodium aluminate was added to the water dispersion liquid of SiC particles A in an amount to be 50 parts by mass (in terms of solids) with respect to 100 parts by mass of the SiC particles A, and this was dissolved therein while stirring the mixture, thereby obtaining a dispersion liquid having a pH of 13.1. Subsequently, a 9.9% by mass aqueous solution of nitric acid was added to the dispersion liquid obtained to adjust the pH to 11.5, then the pH of the dispersion liquid was maintained at a pH of from 10.6 to 11.5 for 60 minutes, and then a 9.9% by mass aqueous solution of nitric acid was further added to the dispersion liquid, thereby obtaining a dispersion liquid having a pH of 10. Thereafter, 32.2 g of pure water was added to the dispersion liquid to obtain a dispersion liquid containing a powder 2-7, whereby the powder 2-7 was prepared.

(Production of Powder 2-8)

A powder 2-8 was prepared in the same manner as in the production of the powder 2-7 except that the SiC particles to be used were changed from SiC particles A to SiC particles B (GC #8000S manufactured by Fujimi Incorporated, powder).

(Production of Powder 2-9)

A 20% by mass water dispersion liquid of SiC particles A was prepared. Subsequently, 9.9 mass % nitric acid and a 1 M aqueous solution of NaOH were added to the water dispersion liquid of SiC particles A so as to be in the same amounts as those added in the production of powder 2-1. At this time, the pH of the dispersion liquid was 0.6. Subsequently, a 30% by mass water dispersion liquid of sodium aluminate was prepared, and the water dispersion liquid of sodium aluminate in an amount corresponding to 50 parts by mass (in terms of solids) of sodium aluminate with respect to 100 parts by mass of the SiC particles A was added to the water dispersion liquid of SiC particles A over 45 minutes while stirring the mixture, but gelation occurred, and the mixture was in a state in which uniform dispersion was not able to be conducted.

<Analysis of Powder>
(Analysis of Composition and Structure)

About 2 mL of a dispersion liquid containing each powder was collected and dropped onto a filter (Nuclepore 5 μm)

(manufactured by WHATMAN). Subsequently, suction filtration was conducted, then the powder was washed on the filter using 10 mL of pure water, and the powder was dried. Thereafter, the powder after being dried was collected on a Cu mesh and subjected to TEM (transmission electron microscope)-EDX (Energy Dispersive X-ray Spectroscopy) observation using a transmission electron microscope HD-2700 manufactured by Hitachi High-Technologies Corporation.

Here, in the TEM-EDX observation of powder, C, Al, and O were selected as the elements to be observed, and it was judged that the SiC particles were coated with a component containing Al and O in a case in which an EDX spectrum of Al was observed and it was confirmed that the position at which the EDX spectra of C, Al, and O were observed and the position at which the particles were observed in the TEM observation image clearly correspond to each other.

In addition, in the EELS analysis of powder, it can be judged that the component containing Al and O contains $Al(OH)_3$ in a case in which it is confirmed that the EELS spectrum observed has a spectral shape (shape different from the spectra of Al and other compounds containing Al and O) unique to the EELS standard spectrum of aluminum hydroxide ($Al(OH)_3$).

(Measurement of Zeta Potential)

The each dispersion liquid which contained the powder and was obtained above, SiC particles A (GC #40,000 manufactured by Fujimi Incorporated, powder), and SiC particles B (GC #8,000S manufactured by Fujimi Incorporated, powder) were diluted with pure water, and 0.01 to 0.1 M NaOH and HCl were used as pH adjusting agents to prepare each solution for zeta potential measurement having a pH of from 3.0 to 10.0 in 1.0 scale.

Here, the pH was measured using a pH meter (model number: F-71) manufactured by Horiba, Ltd.

The zeta potential was measured using a zeta potential measurement apparatus (trade name "Zetasizer nanoZSP") manufactured by Malvern Instruments. Here, the zeta potential was measured using a refractive index of 1.760 and an absorptance of 0.300 which were representative values of general alumina as the measured particle conditions.

The pH to be the isoelectric point (pH of isoelectric point) was calculated by the following equation from the pHs before and after the sign of the zeta potential changed and the zeta potentials at the pHs before and after the, change which were attained by subjecting the solution for zeta potential measurement which had a pH of from 3.0 to 10.0 in 1.0 scale and was prepared above to the measurement.

$$\text{pH of isoelectric point} = \frac{\alpha \times \zeta_\beta - \beta \times \zeta_\alpha}{\zeta_\beta - \zeta_\alpha} \quad [\text{Math. 5}]$$

$\alpha$ and $\beta$: pH values before and after sign of zeta potential changes ($\alpha < \beta$)

$\zeta_\alpha$: zeta potential at pH value $\alpha$ $\zeta_\beta$: zeta potential at pH value $\beta$ (Method for Measuring Number of Aluminum Hydroxide Particles)

The EDX mapping of particles photographed (200 KV, 120 K magnification) using a transmission electron microscope TEM was conducted, particles in which Si, C, O, and Al were all detected were counted as Al component-coated SiC particles. Moreover, particles in which only Al and O were detected and Si and C were not detected were counted as aluminum hydroxide particles. Incidentally, particles in which only Si and C were detected were assumed to be unmodified SiC particles, but such particles did not exist in all Examples and Comparative Examples. In each of Examples and Comparative Examples, the number of aluminum hydroxide particles in 100 particles is described in Table 3.

TABLE 3

Production conditions and properties of each powder

| Powder | Amount of SiC particles used (g) | Amount of sodium aluminate added to 100 parts by mass of SiC particles (parts by mass) | Aqueous solution of acid | Amount of aqueous solution of acid used (g) | Dropping method | pH of isoelectric point | Number of aluminum hydroxide particles in 100 particles | Remarks |
|---|---|---|---|---|---|---|---|---|
| Powder 2-1 | 106.5 | 50 | 9.9% by mass aqueous solution of nitric acid | 323.9 | Simultaneously added | 8.3 | 1 | Example |
| Powder 2-2 | 106.5 | 25 | 9.9% by mass aqueous solution of nitric acid | 169.7 | Simultaneously added | 7.5 | 1 | Example |
| Powder 2-3 | 106.5 | 12.5 | 9.9% by mass aqueous solution of nitric acid | 59.8 | Simultaneously added | 6.3 | 0 | Example |
| Powder 2-4 | 110.5 | 25 | 9.9% by mass aqueous solution of hydrochloric acid | 88.8 | Simultaneously added | 6.6 | 1 | Example |
| Powder 2-5 | 110.5 | 12.5 | 9.9% by mass aqueous solution of hydrochloric acid | 35.5 | Simultaneously added | 6.1 | 0 | Example |
| Powder 2-6 | 110.5 | 5 | 9.9% by mass aqueous solution of hydrochloric acid | 17.8 | Simultaneously added | 5.8 | 0 | Example |
| Powder 2-7 | 106.5 | 50 | 9.9% by mass aqueous solution of nitric acid | 332.3 | Acid added later | 6.7 | 8 | Example (second aspect) |

TABLE 3-continued

Production conditions and properties of each powder

| Powder | Amount of SiC particles used (g) | Amount of sodium aluminate added to 100 parts by mass of SiC particles (parts by mass) | Aqueous solution of acid | Amount of aqueous solution of acid used (g) | Dropping method | pH of isoelectric point | Number of aluminum hydroxide particles in 100 particles | Remarks |
|---|---|---|---|---|---|---|---|---|
| Powder 2-8 | 106.5 (GC8000S) | 50 | 9.9% by mass aqueous solution of nitric acid | 332.3 | Acid added later | 8.1 | 22 | Example (second aspect) |
| Powder 2-9 | 106.5 | 50 | 9.9% by mass aqueous solution of nitric acid | 332.9 | Acid added first | Gelled | Gelled | Comparative Example |

From the results of Table 3, it has been confirmed that the formation of aluminum hydroxide particles is suppressed in the powders 2-1 to 2-6 according to Examples produced by the production method according to the third aspect of the present invention by maintaining the pH at 9.0 or more and 12.0 or less in the step (D). In addition, it has been confirmed that the number of aluminum hydroxide particles in the powders 2-1 to 2-6 according to Examples produced by the production method according to the third aspect of the present invention is smaller than that in the powders 2-7 and 2-8 according to Examples produced by the production method according to the second aspect of the present invention. In addition, with regard to the powder 2-9 according to Comparative Example, in a case in which nitric acid is added first, the dispersion liquid becomes weakly acidic, the pH of the isoelectric point of the SiC particles is also weakly acidic, and thus aggregation of the SiC particles occurs and gelation occurs.

In addition, favorable results that the pH of the isoelectric point increases (close to the isoelectric point of aluminum hydroxide), and at the same time, the formation of aluminum hydroxide particles is also suppressed have been attained in the case of adding sodium aluminate to the water dispersion liquid of SiC particles so that the amount thereof with respect to 100 parts by mass of the SiC particles is at a higher extent as in the powders 2-1 to 2-2 among the powders according to Examples produced by the production method according to the third aspect of the present invention.

The present application is based upon Japanese Patent Application No. 2017-188916 and Japanese Patent Application No. 2017-188921 filed on Sep. 28, 2017, the entire contents of which are incorporated herein by reference.

The invention claimed is:

1. A method for producing an aluminum hydroxide-coated SiC particle powder, comprising:
   a preparing step of preparing a dispersion containing SiC particles, sodium aluminate, and water; and
   a coating step of forming coated particles having a coating layer containing an aluminum hydroxide on a surface of the SiC particles by adding an acid to the dispersion prepared in the preparing step to adjust a pH to a range of from 10 to 12.

2. The production method according to claim 1, wherein an average secondary particle size of the aluminum hydroxide-coated SiC particle powder is 2 μm or less.

3. The production method according to claim 1, wherein a ratio of an average secondary particle size of the aluminum hydroxide-coated SiC particle powder to an average secondary particle size of the SiC particles is 10 or less.

4. The production method according to claim 1, wherein a ratio of an average secondary particle size of the aluminum hydroxide-coated SiC particle powder to an average primary particle size of the SiC particles is 50 or less.

5. A method for producing a dispersion containing an aluminum hydroxide-coated SiC particle powder and a dispersing medium, wherein the aluminum hydroxide-coated SiC particle powder is produced in a state of being dispersed in the dispersing medium in the production method according to claim 1.

6. The production method according to claim 1, wherein the acid is an inorganic acid.

7. The production method according to claim 1, wherein the acid is nitric acid.

8. The production method according to claim 1, further comprising a step of preparing a dispersion of SiC particles containing SiC particles and a dispersing medium by generating the SiC particles in the dispersing medium before the preparing step and to maintain a state in which the SiC particles are dispersed in a dispersing medium from the generation of SiC particles to the coating thereof in the coating step.

9. A method for producing an aluminum hydroxide-coated SiC particle powder, comprising:
   a preparing step of respectively preparing a raw material dispersion (1) which contains SiC particles, an alkali, and water and has a pH of more than 9.0 and 12.0 or less and a raw material solution (2) containing sodium aluminate and water; and
   a coating step of adding the raw material solution (2) and an acid to the raw material dispersion (1) to maintain a pH in a range of from 9.0 to 12.0 and forming coated particles having a coating layer containing the aluminum hydroxide on a surface of the SiC particles.

10. The method for producing an aluminum hydroxide-coated SiC particle powder according to claim 9, wherein an amount of the sodium aluminate used is from 1 to 100 parts by mass with respect to 100 parts by mass of the SiC particles.

11. The method for producing an aluminum hydroxide-coated SiC particle powder according to claim 9, wherein the acid is an inorganic acid.

12. The method for producing an aluminum hydroxide-coated SiC particle powder according to claim 9, wherein the raw material dispersion (1) has a pH of from 10.0 to 12.0.

13. The method for producing an aluminum hydroxide-coated SiC particle powder according to claim 9, wherein the alkali is at least one selected from the group consisting of ammonia, potassium hydroxide, sodium hydroxide, ammonium hydrogen carbonate, ammonium carbonate, potassium hydrogen carbonate, potassium carbonate, sodium hydrogen carbonate, sodium carbonate, tetramethylammonium hydroxide, tetraethylammonium hydroxide, tetrabutylammonium hydroxide, methylamine, dimethylamine, trimethylamine, ethylamine, diethylamine, triethylamine, ethylenediamine, monoethanolamine, N-(β-aminoethyl)ethanolamine, hexamethylenediamine, diethylenetriamine, triethylenetetramine, anhydrous piperazine, piperazine hexahydrate, 1-(2-aminoethyl)piperazine, N-methylpiperazine, guanidine, imidazole, and triazole.

14. The method for producing an aluminum hydroxide-coated SiC particle powder according to claim 9, wherein the alkali is sodium hydroxide.

15. The method for producing an aluminum hydroxide-coated SiC particle powder according to claim 9, wherein the acid is hydrochloric acid or nitric acid.

16. The method for producing an aluminum hydroxide-coated SiC particle powder according to claim 9, wherein the acid is nitric acid.

17. The method for producing an aluminum hydroxide-coated SiC particle powder according to claim 9, wherein the pH in a range of the coating step is from 10.5 to 12.0.

18. A method for producing a dispersion containing an aluminum hydroxide-coated SiC particle powder and a dispersing medium, wherein the aluminum hydroxide-coated SiC particle powder is produced in a state of being dispersed in the dispersing medium in the production method according to claim 9.

\* \* \* \* \*